United States Patent
Harrison

(10) Patent No.: US 9,248,813 B2
(45) Date of Patent: Feb. 2, 2016

(54) VEHICLE STABILITY CONTROL APPARATUS

(75) Inventor: Dudley Harrison, Birmingham (GB)

(73) Assignee: HALDEX BRAKE PRODUCTS LTD. (GB)

( * ) Notice: Subject to any disclaimer, the term of this patent is extended or adjusted under 35 U.S.C. 154(b) by 1844 days.

(21) Appl. No.: 12/262,936

(22) Filed: Oct. 31, 2008

(65) Prior Publication Data
US 2009/0118960 A1 May 7, 2009

(30) Foreign Application Priority Data
Nov. 1, 2007 (GB) .................................. 0721464.6

(51) Int. Cl.
| G06F 7/00 | (2006.01) |
| B60T 8/1755 | (2006.01) |
| B60T 8/17 | (2006.01) |
| B60W 10/18 | (2012.01) |

(52) U.S. Cl.
CPC ............. B60T 8/1755 (2013.01); B60T 8/1708 (2013.01); B60W 10/18 (2013.01); B60T 2230/06 (2013.01); B60W 2300/126 (2013.01)

(58) Field of Classification Search
CPC . B60T 8/1708; B60T 8/1755; B60T 2230/06; B60W 10/18; B60W 2300/126
USPC ........ 701/69, 70, 71, 82, 38, 1; 340/440, 438, 340/436
See application file for complete search history.

(56) References Cited

U.S. PATENT DOCUMENTS

| 6,176,555 | B1 | | 1/2001 | Semsey |
| 6,419,240 | B1 | * | 7/2002 | Burdock et al. ........... 280/5.508 |
| 6,433,681 | B1 | * | 8/2002 | Foo et al. ....................... 340/440 |
| 6,532,419 | B1 | | 3/2003 | Begin et al. |
| 6,861,949 | B2 | * | 3/2005 | Carlson et al. ................. 340/440 |
| 6,941,206 | B2 | * | 9/2005 | Hasegawa et al. .............. 701/38 |
| 2003/0146829 | A1 | * | 8/2003 | Carlson et al. ................ 340/440 |
| 2003/0168908 | A1 | | 9/2003 | Robinson et al. |
| 2004/0007064 | A1 | | 1/2004 | Sakaguchi |
| 2005/0127747 | A1 | | 6/2005 | Robertson |
| 2007/0179699 | A1 | * | 8/2007 | Kinsey ............................ 701/82 |
| 2007/0263301 | A1 | * | 11/2007 | Agrest ........................... 359/843 |
| 2009/0276131 | A1 | * | 11/2009 | Braunberger et al. .......... 701/70 |

FOREIGN PATENT DOCUMENTS

| EP | 1703287 A1 | 9/2006 |
| EP | 1767422 A1 | 3/2007 |

OTHER PUBLICATIONS

UK Search Report, dated Jan. 28, 2008, 2 pages.

* cited by examiner

*Primary Examiner* — Marthe Marc-Coleman
(74) *Attorney, Agent, or Firm* — St Onge Steward Johnston adn Reens LLC

(57) ABSTRACT

An apparatus for controlling the stability of a vehicle including a controller which is adapted to detect when conditions exist under which vehicle rollover is likely and, when such conditions exist, to trigger an alarm signal or initiate a control intervention by means of which the vehicle travel is controlled to reduce the likelihood of vehicle rollover, wherein the apparatus further includes an accelerometer, the accelerometer being configured to measure the acceleration of the vehicle along two non-parallel axes.

10 Claims, 1 Drawing Sheet

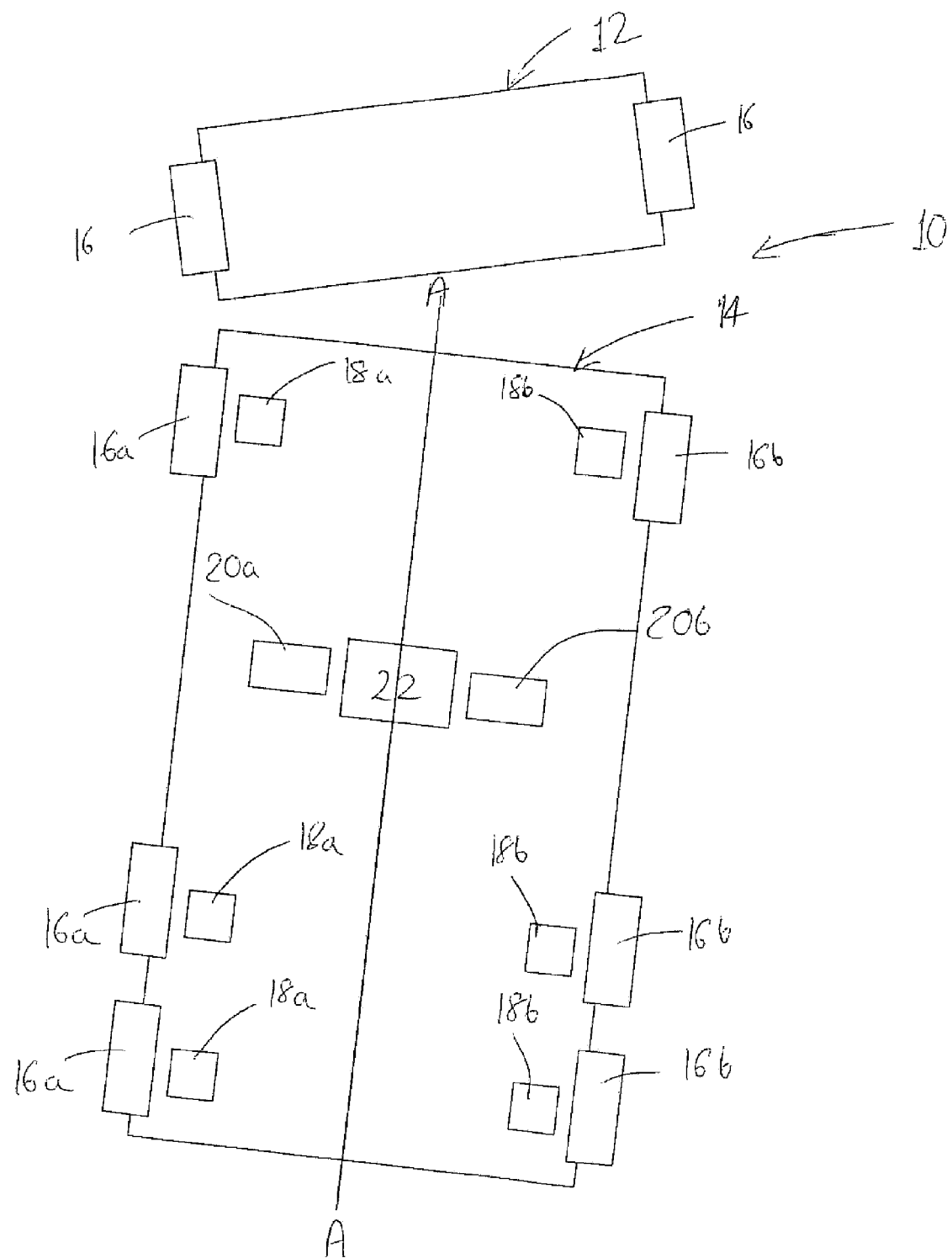

VEHICLE STABILITY CONTROL APPARATUS

CROSS-REFERENCE TO RELATED APPLICATIONS

The present application claims priority of United Kingdom patent application No. 0721464.6 filed on Nov. 1, 2007, the content of which is incorporated herein by reference.

FIELD OF THE INVENTION

The present invention relates to a vehicle stability control system, particularly, but not exclusively to a stability control system for a heavy goods vehicle including a tractor and a trailer or a semi-trailer.

BACKGROUND OF THE INVENTION

It is known to provide a heavy goods vehicle including a tractor and a trailer or semi-trailer with a stability control system which is configured to detect when there is a risk that the vehicle will rollover, and to initiate a stability control intervention, which typically includes the automatic application of the vehicle brakes, in order to reduce the vehicle speed sufficiently to minimise the risk of rollover occurring. Such a stability control system is disclosed in U.S. Pat. No. 6,176,555, and in this system, if the lateral acceleration of the vehicle exceeds a predetermined amount, a test braking pulse is applied to the wheels of the vehicle and the vehicle ABS system monitored. If application of the test braking pulse causes an ABS control intervention to be initiated, it is deduced that one or more of the vehicle wheels has lifted off the ground, and therefore rollover is likely. A stability control intervention, such as automatic actuation of the vehicle brakes, is then initiated. It will be appreciated, therefore, that in order to determine when to apply a test braking pulse, the vehicle must be provided with a sensor capable of determining the lateral acceleration of the vehicle.

SUMMARY OF THE INVENTION

According to a first aspect of the invention we provide an apparatus for controlling the travel of a vehicle including a controller which is adapted to detect when conditions exist under which vehicle stability is compromised and, when such conditions exist, to trigger an alarm signal or initiate a control intervention by means of which the vehicle travel is controlled to improve the vehicle stability, wherein the apparatus further includes accelerometer means, the accelerometer means being configured to measure the acceleration of the vehicle along two non-parallel axes.

In prior art systems, the lateral acceleration of the vehicle is measured using a single axis accelerometer, and, as such, it is necessary to mount the accelerometer in a particular, known, orientation relative to the vehicle, typically generally perpendicular to the longitudinal axis of the vehicle. The accelerometer is typically mounted inside an electronic control unit (ECU) but the orientation in which the ECU is mounted varies from vehicle to vehicle. This means that the orientation of the accelerometer within the ECU has to be set according to the vehicle to which the ECU will be fitted.

By virtue of providing accelerometer means which can measure the acceleration of the vehicle along two non-parallel axes, the lateral acceleration of the vehicle can be determined accurately without the need to position the accelerometer in a particular known orientation relative to the vehicle. This means that a standard ECU and accelerometer combination can be fitted to a wide range of vehicles.

Preferably the accelerometer means is configured to measure the acceleration of the vehicle along two substantially perpendicular axes. The accelerometer may be configured to measure the acceleration of the vehicle along three substantially perpendicular axes.

Advantageously, the system also includes a programmable electronic controller which has a first input for receiving a signal from the accelerometer means, the signal representing the vehicle acceleration along each of the two non-parallel axes, and a second input for receiving a signal representing the speed of the vehicle in a known direction relative to the vehicle, wherein the controller is programmed to determine the orientation of the accelerometer means relative to the vehicle by comparing the signal at the first input with the signal at the second input. Alternatively or additionally, the programmable electronic controller has further inputs for receiving signals representing the speed of at least one wheel on a first side of the vehicle and the speed of at least one wheel on a second, opposite side of the vehicle, wherein the controller is programmed to determine the orientation of the accelerometer means relative to the vehicle by comparing the signal at the first input with the signal at the further inputs.

The controller is advantageously programmed to process the signals at the first input to determine the lateral acceleration of the vehicle, once the orientation of the accelerometer means relative to the vehicle has been determined. The controller may also be programmed to initiate a stability control test braking intervention or a stability control intervention if it determines that the lateral acceleration of the vehicle exceeds a predetermined amount.

BRIEF DESCRIPTION OF THE DRAWINGS

An embodiment of the invention will now be described, by way of example only, with reference to the accompany drawing of which FIG. 1 shows a schematic of a vehicle fitted with an apparatus in accordance with a first aspect of the invention.

DETAILED DESCRIPTION OF THE INVENTION

Referring now to the FIGURE, there is shown a vehicle 10 comprising a tractor 12 and a trailer 14. The trailer has wheels 16a, 16b, and is fitted with an electronic braking system (EBS) apparatus for controlling the stability of the vehicle, in particular for reducing the risk of vehicle rollover. The wheels 16a, 16b of the trailer 14 are each fitted with a brake (not shown) which is operated by a brake actuator 18a, 18b. The brake actuators 18a, 18b in this example are operated pneumatically, but it will be appreciated they could equally be actuated by hydraulic fluid pressure.

A compressed air braking demand signal is supplied to the brake actuators 18 by one of two modulators 20a, 20b. In this example, the first modulator 20a is connected to the actuators 18a on a first side of the trailer 14, and the second modulator 20b is connected to the actuators 18b on the second side of the trailer 14. The actuators 18a, 18b could, however, all be connected to a single modulator, or more than one modulator could be provided for the actuators 18 on a particular side of the trailer 14.

The braking system further includes an electronic control unit (ECU) 22 which is electrically connected to the modulators 20a, 20b and to a brake pedal (not shown) provided in a driver's cab of the tractor 12. When operated, the brake pedal generates an electrical braking demand signal which is transmitted to the ECU 22. The ECU 22 processes the braking demand signal, and transmits an appropriate electrical brake operating signal to the modulators 20a, 20b.

The braking system also includes a plurality of wheel speed sensors, one being provided to measure the rotational speed of each of the trailer wheels 16. The ECU 22 provides the braking system with anti-lock braking control (ABS) and is connected to the wheel speed sensors so as to receive from each wheel speed sensor a signal representing the rotational speed of the respective wheel. The ECU 22 is programmed with conventional ABS algorithms to modify the braking force applied to the wheels 16 if wheel lock is detected.

In addition to providing electronic braking control and anti-lock braking control, the ECU 22 is also programmed to detect when vehicle rollover is likely, and, if required, initiate a stability control intervention, which in this example, includes applying the vehicle brakes so as to reduce the vehicle speed. There are many known methods of detecting when vehicle rollover is likely, and these use signal outputs from a variety of sources such as wheel stroke sensors, wheel speed sensors, or a lateral accelerometer. Whilst one particular methodology of detecting vehicle rollover is described below, it will be appreciated that the present invention is applicable to any configuration of stability control system in which a lateral accelerometer is employed in the determination of whether vehicle rollover is likely.

In this example, the ECU 22 receives a signal from an accelerometer from which it determines the lateral acceleration of the trailer 12. If the lateral acceleration of the trailer 12 exceeds a predetermined amount, the ECU 22 determines in which direction the vehicle is turning, and sends a brake operating signal to the modulator 20a associated with the wheels 16a on the inside of the vehicle's turning curve, so as to apply a low level test braking pulse to these wheels 16a. The ECU 22 then monitors the signals from the wheel speed sensors associated with the wheels to which the test braking pulse was applied, and if the slip of any of these wheels 16a exceeds a predetermined amount, initiates a stability control braking intervention. In this example, a stability control braking intervention comprises sending a braking demand signal to the modulator 20b associated with the wheels 16b on the outside of the vehicle's turning curve, so that a braking force is applied to these wheels 16b, and the vehicle speed reduced. It will be appreciated, however, that the control intervention could comprise reducing the vehicle speed by throttling the engine, or that, instead of initiating an automatic control intervention, ECU 22 could be programmed to initiate a rollover alarm signal on the detection of wheel lift.

In this example, the ECU 22 is provided with a dual axis accelerometer, i.e. a sensor which is capable of providing two signal outputs representing the acceleration of the vehicle along two perpendicular axes. The accelerometer is of standard construction, and includes two pairs of parts, in this example, micro-machined plates, one of which is fixed relative to the ECU 22 and one of which is permitted to move relative to the other under the force generated by the acceleration of the vehicle. In this example, means is provided to measure the electrical capacitance between the plates, which varies in accordance with the plate separation. The accelerometer provides a positive acceleration signal when the plate separation increases, and a negative acceleration signal when the plate separation decreases.

One pair of plates is oriented perpendicular to the first accelerometer axis, and provides a measure of vehicle acceleration parallel to this axis, and the other pair of plates is oriented perpendicular to the second accelerometer axis, and provides a measure of vehicle acceleration parallel to the second axis. It will be appreciated that any configuration of accelerometer which provides a measure of acceleration along two generally parallel axes may be employed instead, however.

The ECU 22 is adapted to be fitted to an appropriate mounting on the vehicle in an orientation such that a first one of the accelerometer axes is generally parallel to the longitudinal axis of the trailer 12, whilst a second one of the accelerometer axes extends generally perpendicular to the longitudinal axis A of the trailer 12. It will therefore be appreciated that the signal representing the acceleration along the first accelerometer axis corresponds to the longitudinal acceleration of the trailer 12, whilst the signal representing the acceleration along the second accelerometer axis corresponds to the lateral acceleration of the trailer 12, the latter being used by the ECU 22 in determining whether a test braking pulse is required.

The mounting for the ECU 22 varies from vehicle to vehicle, and is such that the ECU 22 may be mounted with either one of the accelerometer axis parallel to the longitudinal axis A of the trailer 12. Whilst it would be possible for a user to programme the ECU 22 to tell it which accelerometer signal represents the lateral acceleration of the trailer 12, the ECU 22 is, instead, programmed automatically to work this out for itself, thus removing the need for any user intervention.

To do this, the ECU 22 uses the inputs from the wheel speed sensors to calculate the speed of the trailer 12 parallel to its longitudinal axis A (the vehicle reference speed) using algorithms employed in standard ABS control systems. Each time the vehicle is started, the ECU 22 uses this vehicle reference speed to calculate the trailer acceleration parallel to the longitudinal axis A of the trailer 12. It then compares the acceleration calculated from the speed signal, to the accelerometer readings, and deduces that the accelerometer axis for which the acceleration reading most closely matches the acceleration values calculated from the speed signal is generally parallel to the longitudinal axis A of the trailer 12, and therefore that the signal representing the trailer acceleration along the other accelerometer axis corresponds to the lateral acceleration of the trailer 12.

As will be appreciated, although it is known which of the accelerometer axes A is parallel to the longitudinal axis of the trailer 12 and which is perpendicular to the longitudinal axis A of the trailer 12, the accelerometer can still be oriented in one of two ways. If desired, the ECU 22 can also be programmed to determine in which of these two possible orientations, the accelerometer lies.

As mentioned above, the signal representing the acceleration is positive if the plate separation increases and negative if the plate separation decreases. The vehicle cannot travel above a certain speed in reverse gear, and therefore if the vehicle reference speed exceeds that speed, it can be deduced that the vehicle is accelerating in the forward direction. This could, alternatively, be deduced if directional wheel speed sensors are provided. If, when the vehicle is travelling in the forward direction and is accelerating, the longitudinal acceleration signal from the accelerometer is negative, it can be deduced that the accelerometer is oriented with the fixed plate of the pair perpendicular to the longitudinal axis A of the trailer 12 towards the rear of the vehicle relative to the floating plate, whilst if the signal from the accelerometer is positive, it can be deduced that the accelerometer is oriented with the fixed plate of the pair perpendicular to the longitudinal axis A of the trailer 12 towards the front of the vehicle relative to the floating plate.

If the ECU 22 has a non-volatile memory, it could be programmed to store this information in its memory, so that it does not need to make this determination every time the vehicle 10 is started up. It is, however, advantageous to repeat this process every time the vehicle is started, at least to verify that the information stored in the memory is correct, in case the ECU 22 has been transplanted into a different vehicle and mounted in a different orientation.

The distance over which the accelerometer orientation determination can be made will vary—if the vehicle accelerates and decelerates rapidly shortly after start-up, the determination can be made sooner than otherwise. Typically, the determination can be made within the first few hundred meters of travel. The roll stability detection system is, of course, disabled until a determination of the lateral acceleration of the trailer 12 has been made.

In order to speed up the determination of the accelerometer orientation, the ECU 22 can also be programmed to use a comparison of wheel speed measurements on opposite sides of the trailer 12. When the vehicle is turning, the wheels on the outside of the turn travel faster than the wheels on the inside of the turn. Thus by comparing the speeds of wheels on opposite sides of the trailer 12, the ECU 22 can determine if the vehicle is turning, and in which direction the vehicle is turning.

Whilst the vehicle is turning, the accelerometer will detect acceleration both parallel and perpendicular to the longitudinal axis A, and the accelerometer readings will be both positive, both negative, or one negative and the other positive, depending on the configuration of the accelerometer, the direction the vehicle is turning, whether the vehicle speed is increasing or decreasing as the vehicle turns, and the orientation of the accelerometer relative to the trailer 12. The configuration of the accelerometer, i.e. the arrangement of the fixed plates relative to the floating plates, is known, as are the direction of the turn, and vehicle speed. It therefore possible to use the sign of the two accelerometer readings to deduce the orientation of the accelerometer relative to the trailer 12, and hence determine which reading corresponds to the lateral acceleration of the trailer 12.

Again the distance over which the accelerometer orientation determination can be made in this way will vary—if the vehicle turns to a significant degree shortly after start-up, the determination can be made sooner than otherwise. Similarly, if the vehicle travels only in a straight line after start-up, this method of determining the accelerometer orientation cannot be used, but, if the lateral acceleration is required only in detection of roll instability, as roll stability detection is only required when the vehicle is negotiating a turn, this is not a particular problem.

The accuracy of this method of determining the accelerometer orientation is, however, compromised if there is vehicle braking, as, if braking occurs, if the wheels 16a on one side of the trailer 12 are travelling on a different surface to the wheels 16b on the other side of the trailer 12, the wheels may slip to differing degrees. Consideration of the wheel speed differential at such a time would give rise to a false indication that the vehicle is turning. Consequently, in this embodiment of the invention, the ECU 22 is programmed not to use the wheel speed differential in determining the accelerometer orientation whilst the vehicle is braking. This need not be the case, however, and any inaccuracies in the determination of the accelerometer orientation due to vehicle braking could be avoided by processing the wheel speed information and accelerometer signals over a longer period of time, thus improving the confidence level of the orientation determination.

By using both the vehicle reference speed and the wheel speed differential, the time taken to determine the accelerometer orientation can be minimised. It will be appreciated that either method could be used alone, however.

If the ECU 22 has a non-volatile memory, it could be programmed to store the accelerometer orientation in its memory, so that it does not need to make this determination every time the vehicle 10 is started up. It is, however, advantageous to repeat this process every time the vehicle is started, at least to verify that the information stored in the memory is correct, in case the ECU 22 has been transplanted into a different vehicle and mounted in a different orientation.

Once the orientation of the accelerometer has been determined, the longitudinal accelerometer reading is not required for the stability control system described above. It can, however, be used for other purposes, such as to provide an indication of the longitudinal inclination of the vehicle, when moving or stationery.

The system described above is a relatively simple embodiment of the invention. In more sophisticated systems according to the invention, the ECU 22 can be programmed to determine the lateral acceleration of the trailer 12 whatever the orientation of the accelerometer. This can be achieved by using directional wheel speed sensors to provide a signal representing the vehicle velocity, and standard mathematical vector resolution techniques in the comparison of the velocity signal derived longitudinal acceleration with the accelerometer derived accelerations to determine the orientation of the accelerometer axes relative to the longitudinal axis A of the trailer 12, and then using this information in resolving the accelerometer readings to provide a value for the transverse acceleration of the trailer 12. It will be appreciated that, this can only be achieved using a dual axis accelerometer if the accelerometer orientation is constrained to the extent that the accelerometer axes can extend in any direction in a plane parallel to the longitudinal axis A of the trailer 12.

If the accelerometer orientation is completely unconstrained, determination of the lateral acceleration of the trailer 12 using the method described above is possible, providing a three axis accelerometer, i.e. an accelerometer which provides a measure of acceleration along three non-parallel axes.

Where dual or three axis accelerometers are used as described above, preferably the axes are orthogonal. This need not be the case, however, as the standard mathematical vector resolution techniques can equally be applied using non-orthogonal but non-parallel axes.

When using a three axis accelerometer, the measurement of the vehicle acceleration in a generally vertical direction can be stored by the ECU 22 in order to provide an indication of the harshness of the operating conditions of the vehicle over time. It will be appreciated that the vertical vibrations to which the trailer 12 is subjected during use can cause damage to the trailer 12, and therefore this information can be used to determine when the trailer 12 may need to be serviced, repaired or replaced.

When used in this specification and claims, the terms "comprises" and "comprising" and variations thereof mean that the specified features, steps or integers are included. The terms are not to be interpreted to exclude the presence of other features, steps or components.

What is claimed is:

1. An apparatus for controlling the stability of a vehicle including an accelerometer and a controller which uses a signal derived from the accelerometer and representative of the lateral acceleration of the vehicle to detect when conditions exist under which vehicle stability is compromised and, when such conditions exist, to trigger an alarm signal or initiate a control intervention by means of which the vehicle travel is controlled to improve the stability of the vehicle, wherein the accelerometer is configured to measure the acceleration of the vehicle along two non-parallel axes, wherein the apparatus also includes a programmable electronic controller which has a first input for receiving a signal from the accelerometer, the signal representing the vehicle acceleration along each of the two non-parallel axes, and a second input for receiving a signal representing a speed of the vehicle in a known direction relative to the vehicle, wherein the controller is programmed to determine an orientation of the accelerometer relative to the vehicle by comparing the signal at the first input with the signal at the second input.

2. The apparatus of claim 1 wherein the accelerometer is configured to measure the acceleration of the vehicle along two substantially perpendicular axes.

3. The apparatus of claim 1 wherein the accelerometer is configured to measure the acceleration of the vehicle along three substantially perpendicular axes.

4. The apparatus of claim 1 wherein the controller is programmed to process the signals at the first input to determine the lateral acceleration of the vehicle, once the orientation of the accelerometer relative to the vehicle has been determined.

5. The apparatus of claim 1 wherein the controller is programmed to initiate a stability control test braking intervention or a stability control intervention if it determines that the lateral acceleration of the vehicle exceeds a predetermined amount.

6. An apparatus for controlling the stability of a vehicle including an accelerometer and a controller which uses a signal derived from the accelerometer and representative of the lateral acceleration of the vehicle to detect when conditions exist under which vehicle stability is compromised and, when such conditions exist, to trigger an alarm signal or initiate a control intervention by means of which the vehicle travel is controlled to improve the stability of the vehicle, wherein the accelerometer is configured to measure the acceleration of the vehicle along two non-parallel axes, wherein the apparatus includes a programmable electronic controller which has a first input for receiving a signal from the accelerometer, the signal representing the vehicle acceleration along each of the two non-parallel axes, and further inputs for receiving signals representing a speed of at least one wheel on a first side of the vehicle and the speed of at least one wheel on a second, opposite side of the vehicle, wherein the controller is programmed to determine an orientation of the accelerometer relative to the vehicle by comparing the signal at the first input with the signal at the further inputs.

7. The apparatus of claim 6 wherein the accelerometer is configured to measure the acceleration of the vehicle along two substantially perpendicular axes.

8. The apparatus of claim 6 wherein the accelerometer is configured to measure the acceleration of the vehicle along three substantially perpendicular axes.

9. The apparatus of claim 6 wherein the controller is programmed to process the signals at the first input to determine the lateral acceleration of the vehicle, once the orientation of the accelerometer relative to the vehicle has been determined.

10. The apparatus of claim 6 wherein the controller is programmed to initiate a stability control test braking intervention or a stability control intervention if it determines that the lateral acceleration of the vehicle exceeds a predetermined amount.

* * * * *